United States Patent
Imaizumi et al.

(10) Patent No.: US 12,439,943 B2
(45) Date of Patent: Oct. 14, 2025

(54) SEAFOOD/LIVESTOCK MEAT PRODUCT IMPROVEMENT AGENT AND SEAFOOD/LIVESTOCK MEAT PRODUCT

(71) Applicant: NIHON SHOKUHIN KAKO CO., LTD., Tokyo (JP)

(72) Inventors: Akane Imaizumi, Fuji (JP); Yusuke Ogawa, Hino (JP); Ryuichi Ando, Fuji (JP)

(73) Assignee: NIHON SHOKUHIN KAKO CO., LTD., Tokyo (JP)

( * ) Notice: Subject to any disclaimer, the term of this patent is extended or adjusted under 35 U.S.C. 154(b) by 1012 days.

(21) Appl. No.: 17/599,217

(22) PCT Filed: Mar. 25, 2020

(86) PCT No.: PCT/JP2020/013343
§ 371 (c)(1),
(2) Date: Sep. 28, 2021

(87) PCT Pub. No.: WO2020/203554
PCT Pub. Date: Oct. 8, 2020

(65) Prior Publication Data
US 2022/0174997 A1 Jun. 9, 2022

(30) Foreign Application Priority Data
Mar. 29, 2019 (JP) .................................. 2019-069196

(51) Int. Cl.
| A23L 13/40 | (2023.01) |
| A23L 13/60 | (2016.01) |
| A23L 17/00 | (2016.01) |
| A23L 29/212 | (2016.01) |

(52) U.S. Cl.
CPC .............. *A23L 13/40* (2016.08); *A23L 13/65* (2016.08); *A23L 17/70* (2016.08); *A23L 29/212* (2016.08); *A23V 2002/00* (2013.01)

(58) Field of Classification Search
CPC . A23L 13/40; A23L 13/65; A23L 1/70; A23L 29/212
See application file for complete search history.

(56) References Cited

U.S. PATENT DOCUMENTS

2014/0087052 A1   3/2014   Kawai et al.

FOREIGN PATENT DOCUMENTS

| CN | 103561587 A | 2/2014 |
| JP | 59-031672 A | 2/1984 |
| JP | 62-011076 A | 1/1987 |
| JP | 05-049452 A | 3/1993 |
| JP | 2005-318871 A | 11/2005 |
| JP | 2007-006724 A | 1/2007 |
| JP | 2007-300918 A | 11/2007 |
| JP | 2013-000108 A | 1/2013 |
| JP | 2013-102742 A | 5/2013 |
| JP | 2013-110973 A | 6/2013 |
| JP | 2014-054225 A | 3/2014 |
| JP | 2016-073262 A | 5/2016 |
| WO | 2012/164801 A1 | 12/2012 |
| WO | 2013076879 A1 | 5/2013 |
| WO | 2018123257 A1 | 7/2018 |

OTHER PUBLICATIONS

Extended European Search Report dated Nov. 24, 2022 in European Application No. 20782704.9.
International Preliminary Report on Patentability with translation of Written Opinion dated Oct. 14, 2021 in International Application No. PCT/JP2020/013343.
Isao Kobayashi, "How to Select the Correct Modified Starch to Improve the Food Texture", Japan Oil Chemists Society, 2015, vol. 407 (8 pages).
International Search Report for PCT/JP2020/013343 dated Jun. 2, 2020 [PCT/ISA/210].
Written Opinion for PCT/JP2020/013343 dated Jun. 2, 2020 [PCT/ISA/237].
Notice of Reasons for Refusal for Japanese Patents Application 2019-069196 dated Aug. 20, 2019.

*Primary Examiner* — Katherine D Leblanc
(74) *Attorney, Agent, or Firm* — Sughrue Mion, PLLC

(57) ABSTRACT

Provided are a seafood/livestock meat product improvement agent that can impart meaty firmness when used in a seafood/livestock meat product, and a seafood/livestock meat product. This seafood/livestock meat product improvement agent contains an oil/fat-processed starch having a heat solubility of 3% to 25% and a heat swelling degree of 8 times to 17 times, and is characterized in that the pH of the oil/fat-processed starch is 3.3 or higher and less than 6.5. The oil/fat-processed starch is preferably an oil/fat-processed distarch phosphate. The seafood/livestock meat product is characterized by containing the seafood/livestock meat product improvement agent described above.

14 Claims, No Drawings

SEAFOOD/LIVESTOCK MEAT PRODUCT IMPROVEMENT AGENT AND SEAFOOD/LIVESTOCK MEAT PRODUCT

CROSS REFERENCE TO RELATED APPLICATIONS

This application is a National Stage of International Application No. PCT/JP2020/013343 filed Mar. 25, 2020, claiming priority based on Japanese Patent Application No. 2019-069196 filed Mar. 29, 2019.

TECHNICAL FIELD

The present invention relates to a seafood/livestock meat product improvement agent having an effect of improving the texture of a seafood/livestock meat product, and to a seafood/livestock meat product containing said improvement agent.

BACKGROUND ART

In meatballs, hamburger patties, and other kneaded products with livestock meat, starch is used not only as a meat binder and a bulking material, but also for the purpose of improving traits of texture such as meaty chewiness. Additionally, in processed meat products such as loin ham and pork cutlet, a starch-containing pickling liquid, etc., is used in order to improve meaty qualities such as fibrous texture, elasticity, flavor, color tone, etc. Furthermore, in kneaded products with seafood such as kamaboko, chikuwa, and fried kamaboko, starch is used not only as a simple binder and a bulking material, but also to improve the crisp and elastic texture, i.e., the "springiness," specific to kneaded products with seafood. Among starches used in these seafood/livestock meat products, for example, potato starch has the advantages of good water retention and a high elasticity-reinforcing effect, but has had problems such as the product becoming brittle, liquid release, and losing the original texture over time. Additionally, wheat starch has the excellent prevention of retrogradation as unmodified starch, but has had a problem in that the texture becomes brittle. Additionally, although tapioca starch has high water-retaining ability and is excellent as a bulking material, tapioca starch has had problems in that because of the pastiness and sliminess specific to starch, the fibrous texture of meat is lost and the texture becomes too soft compared to kneaded products that do not contain tapioca starch. Thus, unmodified starch has both advantages and disadvantages when used in seafood/livestock meat products.

To address such problems in the conventional art, the physical properties of starch have been improved by carrying out chemical or physical processing on starch, and such processed starches have been used in seafood/livestock meat products.

For example, patent document 1 below indicates that a product having elasticity, water retention, and the prevention of retrogradation is obtained by blending acetylated starch, phosphorylated starch, succinic acid starch, octenyl succinic acid starch, or another processed starch into a kneaded product with seafood.

Patent document 2 listed below indicates that a product having better elasticity and texture and much less change over time than conventional-art products is obtained by adding esterified starch, etherified starch, cross-linked esterified starch, cross-linked etherified starch, or another processed starch in the production of fibrous kamaboko.

Patent document 3 listed below indicates that by blending a processed starch having a specific cold water swelling degree and heat swelling degree, it is possible to increase the amount of fish meat replaced by modified starch while maintaining the original texture of a kneaded product with seafood, so that costs can be reduced.

Patent document 4 listed below proposes a quality improvement agent for processed meat foodstuffs, the agent containing an oil/fat-processed starch that contains oil and fat and glycerin organic acid fatty acid ester, and the agent being used to obtain a product having good texture and improved yield.

Patent document 5 listed below proposes a quality improvement agent for meat that contains powdered curdlan and an oil/fat-processed starch containing oil and fat and glycerin organic acid fatty acid ester, and that can minimize the decrease in texture of meat ingredients even after retort sterilization.

Patent document 6 listed below proposes a food product improvement agent that contains an oil/fat-processed starch and an egg white decomposition product, that can improve the yield and water retention of a food product, and that improves firmness, elasticity, and other traits of texture.

Patent documents 7 and 8 listed below indicate that by using oil/fat-processed acetylated tapioca starch having specific gelatinization properties in a livestock meat product or a kneaded product with seafood, not only will liquid release and deterioration of texture due to aging of starch over time be minimized, but a texture having adequate elasticity and hardness can be imparted.

Furthermore, patent document 9 listed below indicates that an oil/fat-processed starch satisfying specific solubility and emulsifying ability has excellent flavor and good quality, when being blended into a meat processed product or another food product, and the effects of improving texture and improving yield rate are excellent.

RELATED ART DOCUMENTS

Patent Documents

[Patent Document 1] Japanese Laid-Open Patent Application No. S59-31672
[Patent Document 2] Japanese Laid-Open Patent Application No. S62-11076
[Patent Document 3] Japanese Laid-Open Patent Application No. H5-49452
[Patent Document 4] Japanese Laid-Open Patent Application No. 2005-318871
[Patent Document 5] Japanese Laid-Open Patent Application No. 2007-6724
[Patent Document 6] Japanese Laid-Open Patent Application No. 2007-300918
[Patent Document 7] Japanese Laid-Open Patent Application No. 2013-102742
[Patent Document 8] Japanese Laid-Open Patent Application No. 2013-110973
[Patent Document 9] International Publication No. 2012/164801

DISCLOSURE OF THE INVENTION

Problems the Invention is Intended to Solve

However, these conventional-art modified starches do not truly have an adequate effect of imparting meaty firmness when used in kneaded products with seafood/livestock meat and other seafood/livestock meat products.

Therefore, an object of the present invention is to provide a seafood/livestock meat product improvement agent that can impart meaty firmness when used in a seafood/livestock meat product, and a seafood/livestock meat product.

Means for Solving the Aforementioned Problems

As a result of having performed earnest research intended to solve the problems described above, the present inventors perfected the invention upon discovering that a seafood/livestock meat product having meaty firmness is obtained by using an oil/fat-processed starch having a heat solubility in a specific range, a heat swelling degree in a specific range, and a pH in a specific range in a seafood/livestock meat product.

Specifically, the seafood/livestock meat product improvement agent of the present invention is characterized in that the agent contains an oil/fat-processed starch having a heat solubility of 3% to 25% and a heat swelling degree of 8 times to 17 times, and that the pH of the oil/fat-processed starch is 3.3 or higher and less than 6.5.

In the seafood/livestock meat product improvement agent of the present invention, the seafood/livestock meat product improvement agent preferably contains an oil/fat-processed cross-linked starch having a heat solubility of 4% to 24% and a heat swelling degree of 10 times to 16.5 times, and the pH of the oil/fat-processed cross-linked starch is preferably 3.3 or higher and less than 6.2.

In the seafood/livestock meat product improvement agent of the present invention, the oil/fat-processed starch is preferably an oil/fat-processed distarch phosphete.

Further, the seafood/livestock meat product of the present invention is characterized in that the product contains the seafood/livestock meat product improvement agent described above.

The seafood/livestock meat product of the present invention is preferably a kneaded product with seafood/livestock meat.

In the seafood/livestock meat product of the present invention, the product preferably contains 0.1 to 15 mass % of the oil/fat-processed starch expressed in terms of dry matter of said oil/fat-processed starch.

Effect of the Invention

When the starch composition of the present invention is used as a raw material for a seafood/livestock meat product, a kneaded product with seafood/livestock having meaty firmness can be obtained.

BEST MODE FOR CARRYING OUT THE INVENTION

The oil/fat-processed starch used in the present invention has a heat solubility of 3 to 25%, preferably 4 to 24%, and more preferably 5 to 10%, and a heat swelling degree of 8 to 17 times, preferably 10 to 16.5 times, and more preferably 11 to 16 times. An oil/fat-processed starch having a heat solubility less than 3% is unsuitable because the texture would be powdery. Conversely, an oil/fat-processed starch having a heat solubility exceeding 25% is unsuitable because sliminess and stickiness would be imparted. Additionally, an oil/fat-processed starch having a heat swelling degree less than 8 times is unsuitable because the texture would be powdery. Conversely, an oil/fat-processed starch having a heat swelling degree exceeding 17 times is unsuitable because sliminess and stickiness would be imparted.

In the present invention, heat solubility is a degree of sugar dissolved out from starch granules when starch is gelatinized by heating. The value of heat solubility is related to the decomposition of the starch granules, and is known to commonly decrease due to changes in crystal structure due to the imparting of crosslinking, moist heat treatment, hot water treatment, etc., and increase due to addition of an acetyl group or due to reduction of the molecular weight of the starch. Therefore, in order to lower the heat solubility, a crosslinked structure may be imparted, or the crystal structure may be changed by moist heat treatment, hot water treatment, etc., and in order to raise the heat solubility, an acetyl group may be added or the starch may be reduced in molecular weight.

Furthermore, the heat solubility is also affected by the added percentage of oil and fat in relation to the starch, the heating temperature after the oil and fat has been added, heating time, etc. Therefore, a desired range of heat solubility can be adjusted by the type and amount of a substituent added to the starch, the degree of change in crystal structure, the degree of molecular weight reduction, the added percentage of oil and fat, heating time, etc., and the oil/fat-processed starch exhibiting the desired range of heat solubility can be obtained, for example, by subjecting the starch to cross-linking treatment, hot water treatment, and moist heat treatment as appropriate, dehydrating and drying the starch, and then subjecting the starch to oil and fat-processing treatment and heating as appropriate.

(Method for Measuring Heat Solubility)

In the present invention, heat solubility means a value measured by the following method. Specifically, 0.2 g of a sample expressed in terms of the solid content is dispersed in 19.8 mL of distilled water, heated in a boiling water bath for 30 minutes, and then cooled in a 25° C. water bath for 30 minutes. The liquid is then centrifuged (3000 rpm, 10 min) to separate a precipitate layer and an upper layer. The total amount of sugar contained in the upper layer is measured by the phenol-sulfuric acid method, and the heat solubility is calculated as a mass % concentration with respect to the volume.

In the present invention, the heat swelling degree is an indicator of the degree to which swelling of the starch is minimized, and is a value that decreases commensurately with an increase in the degree to which swelling of the starch is minimized. The value of the heat swelling degree is related to the degree of water retention in the starch granules when the starch is gelatinized by heating, and is known to commonly decrease due to a slight reduction in the molecular weight of starch and to changes in crystal structure due to imparting a strong crosslinked structure, moist heat treatment, hot water treatment, etc., and increase due to the addition of a somewhat cross-linked structure or an acetyl group. Furthermore, the value of the heat swelling degree is also affected by the added percentage of oil and fat in relation to the starch, the heating temperature after oil and fat has been added, the heating time, etc. Therefore, the desired range of heat swelling degree can be adjusted by the type and amount of a substituent added to the starch, the degree of change in crystal structure, the degree of molecular weight reduction, etc., and an oil/fat-processed starch exhibiting the desired range of heat swelling degree can be obtained, for example, by subjecting the starch to cross-linking treatment, hot water treatment, and moist heat treatment as appropriate, dehydrating and drying the starch, and then subjecting the starch to oil and fat-processing treatment and heating as appropriate.

In order to reduce the heat swelling degree, the cross-linking degree may be increased, the heating temperature used in hot water treatment may be increased, or the heating temperature in moist heat treatment may be increased to lengthen the treatment time. Additionally, in order to increase the heat swelling degree, options include: not imparting a cross-linking structure, or lowering the cross-linking degree if a structure is imparted; not performing a hot water treatment, or lowering the heating temperature if a hot water treatment is performed; and not performing a moist heat treatment, or reducing moisture to lower the heating temperature if a moist heat treatment is performed.

(Method for Measuring Heat Swelling Degree)

In the present invention, heat swelling degree means a value quantified by the following method. Specifically, a starch sample in a dry substance amount of 1.0 g is dispersed in 100 mL of water, the dispersion was heated in boiling water for 30 minutes with occasional stirring, and the dispersion was then cooled to 30° C. Next, the paste liquid is centrifuged (3000 rpm, 10 min) to separate a paste layer and a supernatant layer, and the mass of the paste layer is measured and designated as A. Then, after the mass-measured paste layer is dried at 105° C., the mass is measured again and designated as B, and the value of A/B is designated as the heat swelling degree.

The lower limit value of the pH of the oil/fat-processed starch used in the present invention is 3.3 or higher, preferably 3.5 or higher, and more preferably 4.0 or higher. The upper limit value of the pH is less than 6.5, preferably 6.2 or less, more preferably 6.0 or less, even more preferably 5.5 or less, and most preferably 5.0 or less. A pH less than 3.3 would yield a soft texture and be unsuitable because the molecular weight of the starch would readily decrease. A pH of 6.5 or higher would yield a soft texture and be unsuitable because binding between starch and protein would readily be inhibited. The pH of the starch may be adjusted by any method as long as the oil/fat-processed starch obtained in the end has the pH described above; possible examples of methods include adding a pH adjuster to a slurry during preparation of raw material starch before the oil and fat-processing treatment, adding a pH adjuster to a raw material starch powder before the oil and fat-processing treatment, and adding a pH adjuster to the oil/fat-processed starch after the oil and fat-processing treatment.

(Method for Measuring pH of Starch)

In the present invention, the pH of the starch means a value measured by the following measurement method. Specifically, 50 g of distilled water was added to 5 g of starch, and the combination was mixed to yield a dispersion that was measured by a glass electrode method.

There are no particular limitations as to the raw material starch of the oil/fat-processed starch of the present invention, provided that the starch can be used for food. Possible examples include: tapioca starch, potato starch, corn starch, waxy corn starch, wheat starch, rice starch, sweet potato starch, mung bean starch, dogtooth-violet starch, kudzu starch, bracken starch, sago starch, *Cardiocrinum cordatum* var. *glehnii* starch, and other starches; soft-wheat flower, all-purpose flour, hard-wheat flour, and other wheat flours having high starch content; and buckwheat flour, corn flour, barley flour, rye flour, coix flour, Japanese millet flour, foxtail millet flour, and other flours. Of these, tapioca starch and/or potato starch is preferable from an industrial standpoint, and tapioca starch is particularly preferable in terms of ease of processing. Additionally, in any starch, in addition to ordinary flours, those improved by thremmatology techniques or genetic engineering techniques, such as non-glutinous flours, waxy flours, and high-amylose flours may be used. Furthermore, various processing treatments can be carried out as raw material starch in the present invention. Specifically, a flour subjected to chemical modification treatments such as oxidation treatment, esterification treatment, etherification treatment, and cross-linking treatment, and processing treatments such as pregelatinization treatment, granulation treatment, moist heat treatment, ball mill treatment, pulverization treatment, heat treatment, hot water treatment, bleaching treatment, sterilization treatment, acid treatment, alkali treatment, and enzyme treatment, or two or more of these treatments, may be used as the flour. Among these processing treatments, starch subjected to cross-linking treatment, hot water treatment, moist heat treatment, or another swelling minimization treatment is preferable from the standpoint of obtaining heat solubility and heat swelling degree in the specific range required in the present invention, and starch subjected to cross-linking treatment in particular is more preferred.

Cross-linked starch is obtained by cross-linking a starch using, for example, phosphoryl oxychloride, trimetaphosphate, hexametaphosphate, epichlorohydrin, adipic anhydride, or another cross-linking agent known in the conventional art. Among these cross-linking agents, phosphoryl oxychloride is preferable because the reaction efficiency is high and starch that has been subjected to swelling minimization treatment is easy to produce.

The cross-linking degree can be adjusted to a desired degree by adjusting, as appropriate, the amount of the cross-linking agent to be added, the reaction time, the reaction temperature, the reaction pH, and other conditions. This cross-linking degree correlates well with the heat swelling degree of the starch. Specifically, swelling of the starch is minimized by increasing the cross-linking degree, and the heat swelling degree can be minimized.

Starch subjected to a hot water treatment is obtained by, for example, immersing starch in water for a long time at a temperature equal to or below the gelatinization temperature. For example, such starch is obtained by adjusting the water content of the starch as appropriate and treating the starch at about 25 to 70° C. for about 6 to 14 hours. At this time, if the moisture is increased within a range at which the starch does not gelatinize and the heating temperature is raised, swelling of the starch is further minimized, and the heat swelling degree can be minimized.

Starch subjected to moist heat treatment is obtained by, for example, heating starch that contains moisture in an amount so as to not gelatinize even when heated, at a high temperature under conditions of 100% relative humidity. For example, moist-heat-treated starch is obtained by adjusting the moisture content of the starch to about 20 to 25% and treating the starch for about 0.5 to 5 hours at about 100 to 130° C. When such an approach is adopted, swelling of the starch is further minimized when the moisture is increased within a non-gelatinizing range and the heating temperature is raised to increase treatment time.

In the oil/fat-processed starch of the present invention, oil and fat adhere to at least a part of the surfaces of the starch particles, and the surface physical characteristics have changed. The oil/fat-processed starch is obtained by adding and mixing oil and fat into the raw material starch, performing a drying process that is used to adjust the moisture content as necessary, and performing an aging process, and is characterized in that a certain slurry viscosity is expressed.

The oil and fat may be added to and mixed in the raw material starch by any method as long as the oil and fat adheres to at least part of the surfaces of the starch particles; possible examples include adding and mixing oil and fat into powdery starch, and adding and mixing oil and fat into slurry-form starch.

The abovementioned aging treatment involves adding and mixing oil and fat into raw powder starch (adding and mixing oil and fat and performing a drying step when oil and fat has been added and mixed into a starch slurry), and then treating the starch at normal temperature (15° C.) or higher until the viscosity of the 40% starch slurry obtained by suspending starch in water is expressed at 50 mPa·s or higher; for example, the aging process can be carried out by putting the starch in a reactor, extruder, dryer, tank, container, packaging material, etc., and treating the starch at normal temperature (15° C.) or higher. As long as the temperature is normal temperature (15° C.) or higher, the treatment will proceed, and if the temperature is high, the time required for aging is shortened. However, it is preferable to avoid heating at 60° C. or higher. This is because when a treatment at 60° C. or higher is added, the starch tends to decrease in molecular weight and the effect of imparting a meaty firmness tends to decline. Therefore, it is preferable to set conditions under which the molecular weight is not caused to decrease in the aging treatment.

Examples of the oil and fat used for the oil/fat-processed starch of the present invention include oil and fat approved for food, prepared oils, and mixtures thereof, e.g., flaxseed oil, perilla oil, walnut oil, safflower oil, grape oil, soybean oil, sunflower oil, corn oil, cottonseed oil, sesame oil, rapeseed oil, peanut oil, olive oil, palm oil, coconut oil, beef fat, pork fat, chicken fat, sheep fat, whale oil, fish oil, fractionated oils thereof, deodorizing oils, heating oils, ester exchange oils, and other processed oils/fats, etc. Furthermore, substances obtained by fractionating, hydrogenating or transesterifying these animal and vegetable oils/fats, medium-chain fatty acid triglyceride (MCT), etc., are also included. Of these, flaxseed oil, perilla oil, safflower oil, and grape oil are particularly preferable. Additionally, a flour containing a large amount of oil, e.g., soybean flour, rice flour, etc., may be used as a substitute for some or all of the abovementioned edible oil and fat. When oil and fat is added, the added amount relative to the starch solid content is preferably 0.01 to 1.0%, and more preferably 0.05 to 0.5%. Due to the added amount being 0.01 to 1.0%, the seafood/livestock meat product disperses exceptionally well in other raw materials and binds well with protein, and meaty firmness can be imparted.

Additionally, in the oil/fat-processed starch of the present invention, an emulsifier may be used in addition to the oil and fat, as long as the object of the present invention is not impeded. Possible examples of the emulsifier include glycerin fatty acid ester, polyglycerin fatty acid ester, organic acid monoglyceride, sorbitan fatty acid ester, propylene glycol fatty acid ester, sucrose fatty acid ester, and lecithin. Combinations of these emulsifiers may also be used. When an emulsifier is added, the added amount relative to the starch solid content is preferably 0.01 to 1.0% and more preferably 0.05 to 0.5%.

In the present invention, the oil/fat-processed starch obtained as described above may be used without modification as a seafood/livestock meat product improvement agent, or as a seafood/livestock meat product improvement agent with one or more of salts (phosphates, glutamates, citrates, gluconates, carbonates, etc.), protein (milk protein, soy protein, egg white, wheat protein, etc.), amino acids, enzymes (transglutaminase, protease, etc.), sugar, dietary fiber, etc., blended in as appropriate. The agent may be in any form such as powder, liquid, gel, etc. S seafood/livestock meat product having improved texture, etc., can be obtained by adding this seafood/livestock meat product improvement agent to a raw material blend of a seafood/livestock meat product and incorporating the oil/fat-processed starch described above into the seafood/livestock meat product.

The term of seafood/livestock meat product refers to a food product that contains, for example, beef, pork, chicken, mutton, horse meat, or another type of meat, or walleye pollock, marlin, salmon, horse mackerel, sea bream, shrimp, squid, octopus, scallop, or another type of seafood, and that has been at least heat-treated. Possible examples include, inter alia, chicken nuggets, sausages, pressed ham, chopped ham, hamburger patties, meatballs, pot stickers, steamed dumplings, Chinese steamed buns, cabbage roll filling, and other kneaded products with livestock meat, and kamaboko, deep-fried ground fish cakes, minced and steamed fish, fish balls, fish sausage, chikuwa, frozen surimi, and other kneaded products with seafood. The seafood/livestock meat product can include not only for kneaded products, but also for cooked products made by carrying out dipping, injection, or another treatment on livestock meat or seafood using a pickling liquid, a seasoning liquid, etc., containing the oil/fat-processed starch described above. Possible examples include, inter alia, fried chicken, grilled chicken, steamed chicken, grilled pork, pork cutlet, loin ham, bacon, steak, roast beef, grilled meat, fried shrimp, grilled fish, and other cooked products. It is generally known that in these meat products, water is added using a pickling liquid, a seasoning liquid, etc., to increase the yield after cooking with heat, but there have been problems in that the texture is soft and the original meaty texture is lost. By blending the seafood/livestock meat product improvement agent of the present invention into a pickling liquid, a seasoning liquid, etc., a meaty texture can be maintained while a certain yield after cooking with heat is preserved in these meat products.

The seafood/livestock meat product can be produced by a production method publicly known for various food products. Specifically, the oil/fat-processed starch may be added as appropriate by, for example, mixing, kneading, spraying, dusting, sprinkling, dipping, injecting, etc., during the cooking of the seafood/livestock meat product. Among these, the more preferable method is to mix or knead the oil/fat-processed starch into all of the raw materials of the seafood/livestock meat product, and by doing so, the oil/fat-processed starch can be evenly mixed into all of the raw materials of the seafood/livestock meat product; therefore, the effect that the oil/fat-processed starch has on improving the texture, etc., can be more effectively exhibited. As such, the oil/fat-processed starch is more preferred for use in kneaded products.

The blending amount of the oil/fat-processed starch can be set as appropriate in accordance with, inter alia, the type of the food product and the extent of the desired quality improvement effect, but typically, the total raw materials of the seafood/livestock meat product before heating preferably contains 0.1 to 15 mass %, and more preferably 1 to 10 mass %, expressed in terms of dry matter of the oil/fat-processed starch. In addition to the components described above, it shall be apparent that various food materials, food additives, and other components that can be normally used may be used depending on, inter alia, the type of food, as long as the effect of the present invention is not compromised.

EXAMPLES

The details of the present invention shall be described below with examples given, but the technical scope of the present invention is not limited to the following examples. In the present specification, unless otherwise stated, "%," "parts," and other terms are based on mass, and numerical ranges include end points thereof.

[Preparation of Various Samples]

Processed starches of samples 1 to 13 shown in Table 1 below were prepared using tapioca starch as a raw material starch. The specific production procedure of the processed starches is as described below.

TABLE 1

|  | Raw material starch | Oil/fat processing | pH | Heat solubility (%) | Heat swelling degree (times) |
|---|---|---|---|---|---|
| Sample 1 | distarch phosphate | yes | 4.0 | 38.8 | 18.3 |
| Sample 2 | distarch phosphate | yes | 4.2 | 23.1 | 15.4 |
| Sample 3 | distarch phosphate | no | 4.8 | 8.7 | 14.4 |
| Sample 4 | distarch phosphate | yes | 4.5 | 5.6 | 11.6 |
| Sample 5 | distarch phosphate | yes | 7.1 | 10.4 | 12.6 |
| Sample 6 | distarch phosphate | yes | 6.5 | 9.3 | 12.0 |
| Sample 7 | distarch phosphate | yes | 6.0 | 6.5 | 11.5 |
| Sample 8 | distarch phosphate | yes | 3.5 | 7.4 | 13.0 |
| Sample 9 | distarch phosphate | yes | 3.0 | 10.3 | 15.1 |
| Sample 10 | acetylated starch | yes | 5.4 | 40.7 | 66.7 |
| Sample 11 | distarch phosphate | yes | 4.1 | 31.0 | 16.9 |
| Sample 12 | distarch phosphate | yes | 5.8 | 4.4 | 10.1 |
| Sample 13 | distarch phosphate | yes | 4.1 | 23.8 | 16.3 |

[Preparation of Phosphate Cross-Linked Starches]

Water was added to unprocessed tapioca starch to prepare a starch slurry of about 40 mass %, salts, etc., were added as appropriate, and then an alkaline agent was added to adjust the pH to 10 to 12. In this slurry, a phosphoric acid cross-linking reaction was carried out using a phosphoric acid cross-linking agent (phosphoryl oxychloride, sodium trimetaphosphate, etc.), the pH of the starch slurry was neutralized with hydrochloric acid, etc., the slurry was washed using a solution of which the pH had been adjusted as appropriate using a pH adjuster, after which dehydration and drying were performed, and the phosphate cross-linked tapioca starches of samples 1 to 9 and 11 to 13 were obtained.

[Preparation of Acetylated Starch]

Water was added to unprocessed tapioca starch to prepare a starch slurry of about 40 mass %, and an alkaline agent was added to adjust the pH to 8 to 10 as appropriate. Acetic anhydride was then gradually added while adding sodium hydroxide as appropriate so as to preserve an alkaline pH in the starch slurry. The starch slurry was neutralized with hydrochloric acid, etc., and washed with water, dehydrated, and dried to obtain the acetylated tapioca starch of sample 10.

[Method of Oil/Fat-Processing Treatment]

For samples 1, 2, 4 to 11, and 13, water was added and mixed into 100 kg of starch to prepare a wet cake having about 30% moisture, 0.3 kg of oil and fat (a mixture of perilla oil and glycerin fatty acid ester) was added, and the components were evenly mixed by stirring in a mixer. Next, the obtained powder was heated at 40° C. using a shelf-type dryer to adjust the moisture of the powder to about 10%, and the powder was stored until a 40% starch slurry viscosity of 50 mPa·s or higher was expressed at normal temperature. Additionally, for sample 12, the oil/fat-processing treatment was performed in the same manner as described above using 0.2 kg of oil and fat (a mixture of grape oil and glycerin fatty acid ester).

[Method for Measuring 40% Starch Slurry Viscosity]

A sample weighing 120 g in terms of dry matter was dispersed in ice-cold water to bring the total amount to 300 g, and then using a TVB10M viscometer (Toki Sangyo Co., Ltd.), the viscosity was measured as the value obtained after the rotor speed was set to a speed of 60 rpm and rotor no. 1 was caused to rotate for 15 sec.

Test Example 1 (Hamburger Patties)

Hamburger patties were prepared using the starch samples 1 to 13 described above. Specifically, domestic animal meat, seasonings, protein materials, starch, ice water, onions, and bread crumbs were added in the stated order according to the blend shown in Table 2 below, and mixed with a mixer to prepare a dough. The dough was molded into round shapes 50 g each, pan-fried (230° C. for 45 seconds on each side), and steamed (85° C. for 12 min) in the stated order, and cooled to obtain hamburger patties.

The obtained hamburger patties were given sensory evaluations on a scale of 1 to 10 by a panel of six people on the basis of the following criteria, and average values of the results of the evaluations were symbolized according to the following criteria and are shown in Table 3.

Firmness: higher scores were given to greater degrees of force required to bite through the hamburger patties while eating.
X: average value of sensory evaluation results was 1-2
Δ: average value of sensory evaluation results was 3-5
◯: average value of sensory evaluation results was 6-8
⊚: average value of sensory evaluation results was 9-10

Lack of stickiness: higher scores were given to greater degrees of a meaty texture without the stickiness specific to starch when eating
X: average value of sensory evaluation results was 1-2
Δ: average value of sensory evaluation results was 3-5
◯: average value of sensory evaluation results was 6-8
⊚: average value of sensory evaluation results was 9-10

TABLE 2

| Blend | Percentage (%) |
|---|---|
| beef thigh meat | 22 |
| pork thigh meat | 16 |
| pork fat | 6 |
| chopped onions | 16 |
| starch | 7 |
| granular soy protein | 5 |
| bread crumbs | 4.5 |
| sugar | 1 |
| table salt | 0.9 |
| seasoning | 0.6 |
| water | 21 |
| total | 100 |

TABLE 3

| Test Section | Firmness | Lack of stickiness |
|---|---|---|
| sample 1 | Δ | Δ |
| sample 2 | ⊚ | ◯ |
| sample 3 | Δ | ◯ |
| sample 4 | ⊚ | ⊚ |
| sample 5 | X | ⊚ |

TABLE 3-continued

| Test Section | Firmness | Lack of stickiness |
|---|---|---|
| sample 6 | Δ | ◉ |
| sample 7 | ○ | ◉ |
| sample 8 | ○ | ◉ |
| sample 9 | Δ | ○ |
| sample 10 | X | X |
| sample 11 | ○ | Δ |
| sample 12 | ○ | ◉ |
| sample 13 | ○ | ○ |

As is shown in Table 3, sample 10, which was acetylated starch, was clearly inferior to the other samples in terms of firmness and stickiness. Sample 1, which was starch subjected to a swelling minimization treatment, having a heat solubility of 38.8% and a heat swelling degree of 18.3 times, was better than sample 10 in terms of firmness and stickiness, but was still somewhat inferior. Additionally, sample 11, which had a heat solubility of 31.0% and a heat swelling degree of 16.9 times, was better than sample 10 in terms of firmness and stickiness, but was still somewhat inferior particularly in terms of stickiness. Furthermore, sample 3, which was not subjected to an oil/fat-processing treatment, was somewhat inferior particularly in terms of firmness.

In samples 2 and 4, in which the starches were subjected to swelling minimization treatment, the heat solubilities were 23.1% and 5.6%, and the heat swelling degrees were 15.4 times and 11.6 times, favorable firmness and lack of stickiness were successfully imparted to the hamburger patties. Concerning samples 4 to 9, samples 5 and 6 having a pH of 6.5 or higher and sample 9 having a pH of 3.0 or less were inferior to the other samples in terms of firmness. In sample 4 having a pH of 4.5, sample 7 having a pH of 6.0, and sample 8 having a pH of 3.5, favorable firmness and lack of stickiness were successfully imparted to the hamburger patties. Additionally, sample 12, which had a heat solubility of 4.4% and a heat swelling degree of 10.1, and sample 13, which had a heat solubility of 4.1% and a heat swelling degree of 23.8, were satisfactory in terms of firmness and lack of stickiness.

Test Example 2 (Sausage)

Sausages were prepared using the starch samples 1 to 4, 10, and 11 shown in Table 1. Specifically, using the blend shown in Table 4 below, a domestic animal meat, a salting agent, a protein material, ice water, a seasoning, and a starch were added in the stated order and mixed in a food cutter to prepare a dough. The dough was then loaded into a collagen casing, treated sequentially with a drying treatment (60° C. for 20 min), a smoking treatment (70° C. for 20 min), and a steaming treatment (78° C. for 20 min), and cooled.

The obtained sausages were given sensory evaluations on a scale of 1 to 10 by a panel of six people on the basis of the following criteria, and average values of the results of the evaluations were symbolized according to the following criteria and are shown in Table 5.

Firmness: higher scores were given to greater degrees of force required to bite through the sausages while eating.
X: average value of sensory evaluation results was 1-2
Δ: average value of sensory evaluation results was 3-5
○: average value of sensory evaluation results was 6-8
◉: average value of sensory evaluation results was 9-10

Elasticity: higher scores were given to greater degrees of repulsive force felt when chewing the sausages while eating.
X: average value of sensory evaluation results was 1-3
Δ: average value of sensory evaluation results was 4-7
○: average value of sensory evaluation results was 8-10

Lack of stickiness: higher scores were given to greater degrees of a meaty texture without the stickiness specific to starch when eating
X: average value of sensory evaluation results was 1-2
Δ: average value of sensory evaluation results was 3-5
○: average value of sensory evaluation results was 6-8
◉: average value of sensory evaluation results was 9-10

TABLE 4

| Blend | Percentage (%) |
|---|---|
| chicken breast | 39 |
| pork fat | 16 |
| starch | 7 |
| granular soy protein | 4 |
| table salt | 1.5 |
| phosphate preparation | 0.3 |
| nitrate preparation | 0.1 |
| sodium ascorbate | 0.1 |
| seasoning | 2 |
| water | 30 |
| total | 100 |

TABLE 5

| Test Section | Firmness | Elasticity | Lack of stickiness |
|---|---|---|---|
| sample 1 | Δ | Δ | Δ |
| sample 2 | ◉ | ○ | ○ |
| sample 3 | Δ | Δ | Δ |
| sample 4 | ◉ | ○ | ◉ |
| sample 10 | X | Δ | X |
| sample 11 | ○ | Δ | Δ |

As is shown in Table 5, sample 10, which was acetylated starch, was clearly inferior to the other samples in terms of firmness and stickiness. Sample 1, which was starch subjected to a swelling minimization treatment, having a heat solubility of 38.8% and a heat swelling degree of 18.3 times, was better than sample 10 in terms of firmness and stickiness, but was still somewhat inferior. Additionally, sample 11, which had a heat solubility of 31.0% and a heat swelling degree of 16.9 times, was better than sample 10 in terms of firmness and stickiness, but was still somewhat inferior particularly in terms of stickiness. Furthermore, sample 3, which was not subjected to an oil/fat-processing treatment, was somewhat inferior particularly in terms of firmness and elasticity.

In samples 2 and 4, in which the starches were subjected to swelling minimization treatment, the heat solubilities were 23.1% and 5.6%, and the heat swelling degrees were 15.4 times and 11.6 times, favorable firmness and elasticity were successfully imparted to the sausages.

The invention claimed is:

1. A seafood/livestock meat product improvement agent, comprising an oil/fat-processed starch having a heat solubility of 3% to 25% and a heat swelling degree of 8 times to 17 times, and that the pH of the oil/fat-processed starch is 3.3 or higher and 6.0 or less.

2. The seafood/livestock meat product improvement agent according to claim 1, wherein the oil/fat-processed cross-linked starch has a heat solubility of 4% to 24% and a heat swelling degree of 10 times to 16.5 times, and wherein the pH of the oil/fat-processed cross-linked starch is 3.3 or higher and 5.5 or less.

3. The seafood/livestock meat product improvement agent according to claim 1, the oil/fat-processed starch being an oil/fat-processed distarch phosphate.

4. The seafood/livestock meat product improvement agent according to claim 2, the oil/fat-processed starch being an oil/fat-processed distarch phosphate.

5. A seafood/livestock meat product containing the seafood/livestock meat product improvement agent according to claim 1.

6. The seafood/livestock meat product according to claim 5, the product being a kneaded product with seafood/livestock meat.

7. The seafood/livestock meat product according to claim 5, the product containing 0.1 to 15 mass % of the oil/fat-processed starch expressed in terms of dry matter of said oil/fat-processed starch.

8. The seafood/livestock meat product according to claim 6, the product containing 0.1 to 15 mass % of the oil/fat-processed starch expressed in terms of dry matter of said oil/fat-processed starch.

9. A seafood/livestock meat product containing the seafood/livestock meat product improvement agent according to claim 2.

10. The seafood/livestock meat product according to claim 9, the product being a kneaded product with seafood/livestock meat.

11. A seafood/livestock meat product containing the seafood/livestock meat product improvement agent according to claim 3.

12. The seafood/livestock meat product according to claim 11, the product being a kneaded product with seafood/livestock meat.

13. A seafood/livestock meat product containing the seafood/livestock meat product improvement agent according to claim 4.

14. The seafood/livestock meat product according to claim 13, the product being a kneaded product with seafood/livestock meat.

* * * * *